(12) United States Patent
Danielson

(10) Patent No.: US 8,336,918 B2
(45) Date of Patent: Dec. 25, 2012

(54) ELECTRICALLY DRIVEN CONNECTOR

(75) Inventor: Robert Danielson, Ham Lake, MN (US)

(73) Assignee: Fastest, Inc., Roseville, MN (US)

( * ) Notice: Subject to any disclaimer, the term of this patent is extended or adjusted under 35 U.S.C. 154(b) by 1520 days.

(21) Appl. No.: 11/845,270

(22) Filed: Aug. 27, 2007

(65) Prior Publication Data

US 2009/0001719 A1 Jan. 1, 2009

Related U.S. Application Data

(60) Provisional application No. 60/947,135, filed on Jun. 29, 2007.

(51) Int. Cl.
*F16L 55/00* (2006.01)
(52) U.S. Cl. ............ 285/39; 285/101; 285/309; 285/310
(58) Field of Classification Search .................. 285/39, 285/101, 309–310, 338, 345–346
See application file for complete search history.

(56) References Cited

U.S. PATENT DOCUMENTS

| | | | |
|---|---|---|---|
| 2,603,509 A | 7/1952 | Eskin et al. | |
| 3,780,912 A * | 12/1973 | Sanz | 222/282 |
| 4,662,654 A | 5/1987 | Marshall | |
| 5,058,929 A * | 10/1991 | Zentner et al. | 285/39 |
| 5,065,577 A | 11/1991 | Markunas | |
| 5,144,801 A | 9/1992 | Scanderbeg et al. | |
| 5,343,798 A | 9/1994 | Meisinger et al. | |
| 5,507,537 A | 4/1996 | Meisinger et al. | |
| 5,788,290 A | 8/1998 | Meisinger | |
| 6,691,980 B2 | 2/2004 | Larsen et al. | |
| 6,751,953 B2 | 6/2004 | Mentink et al. | |
| 6,997,083 B1 | 2/2006 | Olszewski | |

OTHER PUBLICATIONS

Serial No. Unknown, Title: Modular Connector, filed Aug. 27, 2007, Inventor: Robert Danielson, 41 pages.
International Search Report for PCT/US2008/056512, dated Aug. 14, 2008.

* cited by examiner

*Primary Examiner* — Daniel P. Stodola
*Assistant Examiner* — Fannie Kee
(74) *Attorney, Agent, or Firm* — Hamre, Schumann, Mueller & Larson, P.C.

(57) ABSTRACT

A connector that is designed with an integrated electric drive mechanism to actuate the connector to connect a first fluid system to a second fluid system. The connector includes a connector body, a connection mechanism connected to the connector body and configured to connect the connector to the second fluid system, and an electric motor connected to the connector body and to the connection mechanism to actuate the connection mechanism.

21 Claims, 8 Drawing Sheets

ELECTRICALLY DRIVEN CONNECTOR

This application claims the benefit of U.S. Provisional Application No. 60/947135, filed on Jun. 29, 2007, the entire contents of which are incorporated herein by reference.

FIELD

A connector that fluidly connects a first fluid system to a second fluid system for performing processing operations, for example charging, evacuation and/or testing, on the second fluid system.

BACKGROUND

A connector is often used to connect an external fluid system, for example charging, evacuation and/or testing equipment, to a second fluid system, for example manufacturing, test, or processing equipment. Once the connection is made and any valves are opened, fluid can flow through the connector either into the second fluid system or from the second fluid system depending on the processing operation being performed.

Connectors are typically designed to be manually actuated in a suitable manner, although pneumatic/hydraulic actuated connectors are also known. With manual and pneumatic/hydraulic connector actuation, the connection forces are hard to control which can be problematic when connecting to a delicate or fragile fluid system. Further, space constraints may limit or prevent use of manually actuated connectors. Pneumatic actuated connectors also require compressed air, which is an added cost and can introduce contaminants which is detrimental in applications where contaminants need to be avoided, for example medical applications.

SUMMARY

A connector is described that is designed with an integrated electric drive mechanism to actuate the connector. The connector fluidly connects a first fluid system to a second fluid system for performing processing operations, for example charging, evacuation and/or testing, on the second fluid system through the connector.

The electric drive mechanism is integrated into and forms part of the connector. The electric drive mechanism includes an electric motor coupled to a gear box which acts as a gear reducer to increase or decrease torque from the motor. In one implementation, the gear reducer drives a screw drive, and a drive nut on the screw drive engages an actuation piston of the connector to cause connection or to disengage the connection. In another embodiment, the gear reducer can drive a ball drive which has less friction than a screw drive which may be useful in certain applications.

The use of an electric drive mechanism allows more precise control of connection forces. Further, the connector can be used in locations where manual actuation is difficult or impossible. An electric drive mechanism also has a long life, and avoids the use of compressed air thereby avoiding that additional cost and reducing the introduction of contaminants. For applications of the connector requiring cleanliness, for example in a clean room, the electric motor can be sterilized in an autoclave.

BRIEF DESCRIPTION OF THE DRAWINGS

Further details are explained below with the help of the examples illustrated in the attached drawings in which.

DETAILED DESCRIPTION

Figure 1:
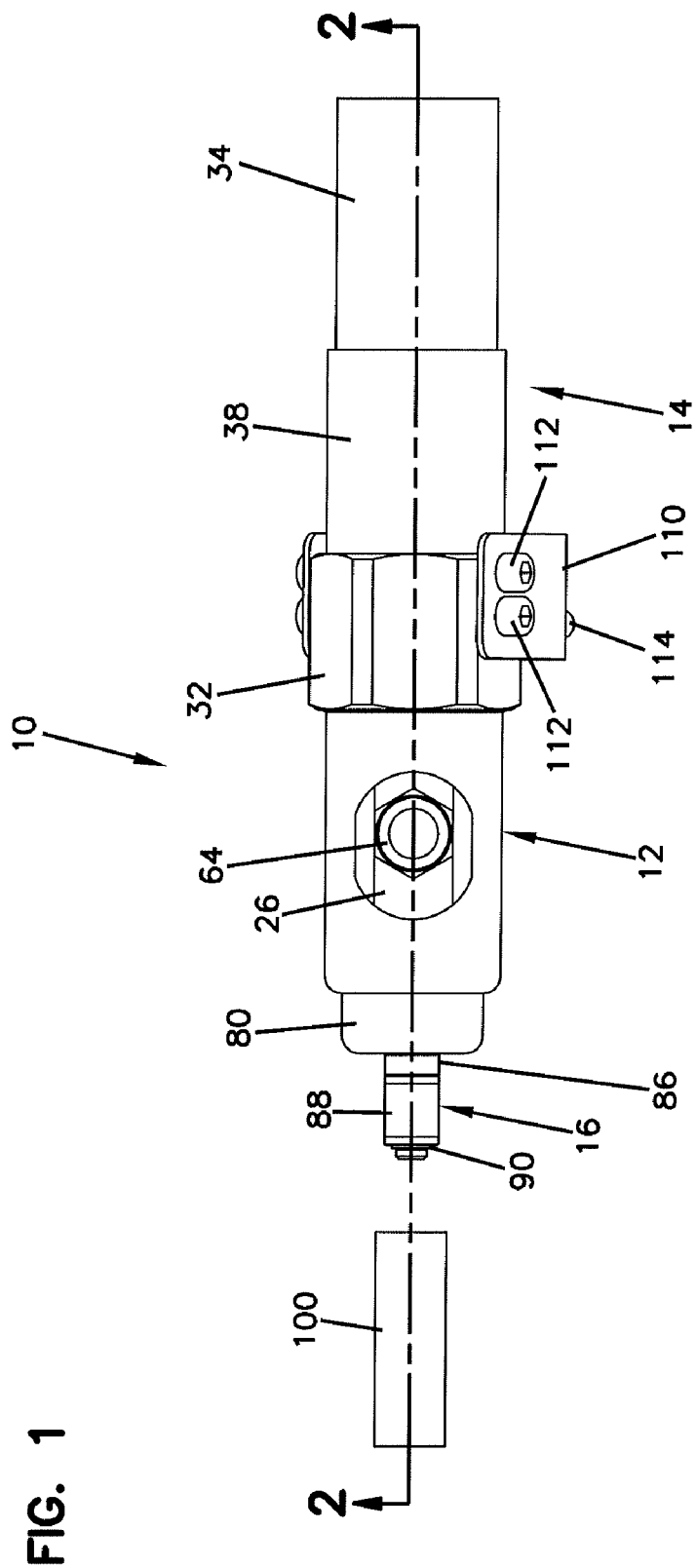
FIG. 1 is a top view of a connector in accordance with one exemplary embodiment.

With reference initially to FIG. 1, a connector 10 is illustrated that fluidly connects a first fluid system to a second fluid system for performing processing operations, for example charging, evacuation and/or testing, on the second fluid system. The first fluid system to which the connector 10 is attached can be, for example, a source of air or helium for testing. The second fluid system to which the connector 10 is intended to connect to can be, for example, a fluid reservoir. However, the connector 10 can be used with other fluid systems in which a connector is used to fluidly connect a first fluid system to a second fluid system.

The connector 10 includes a connector body 12, an electric drive mechanism 14 for actuating the connector, and a connection mechanism 16 for connecting to a fluid system.

The electric drive mechanism 14 can be any electrically driven mechanism suitable for actuating the connector 10. Preferably, the electric drive mechanism 14 includes a reversible electric motor that generates connection and disconnection forces. The electric motor is connected to the connection mechanism in a suitable manner for actuating the connection mechanism to achieve connection and disconnection.

The connection mechanism 16 can be any one of a number of different connection mechanisms known in the art, and the connection mechanism 16 used is dependent in part upon the type of fluid system to be connected to and the specifics of the interface provided on the fluid system to which the connector 10 is to connect. It is preferable that the connection mechanism 16 at least seals with the fluid system interface to prevent fluid leakage. In certain embodiments, the connection mechanism 16 may also grip with the fluid system interface. The connection mechanism 16 described herein is exemplary only.

The connector body 12 includes a generally hollow, tubular sleeve 20 having an externally threaded back end 22 and an externally threaded front end 24. As best seen in FIG. 1, the sleeve 20 includes an elongated slot 26 formed therethrough. An actuation piston 30 is slideably disposed within the sleeve 20, with relative sliding movement between the piston 30 and the sleeve 20 being permitted.

A hexagonal nut 32 is threaded onto the back end 22 of the sleeve 20. The nut 32 forms a means for connecting the electric drive mechanism 14 to the connector body 12. The drive mechanism 14 includes an electric motor 34 having a drive shaft 36 connected to a suitable reduction mechanism 38, for example a gear box, to increase torque. The electric motor 34 can be connected to any suitable source of electricity, for example a 120V course or to one or more batteries. The reduction mechanism 38 is fixed to the nut 32 via a flange 40 that is integral with the nut 32 and screws 42 that extend through the flange 40 and into threaded receptacles on the reduction mechanism 38. The electric motor 34 is preferably a two-way motor to allow forward and reverse rotation of the drive shaft 36.

The reduction mechanism 38 includes an output 44 that is fixed to a screw drive 46 for rotating the screw drive 46. The screw drive 46 extends into a hollow portion at the rear of the actuation piston 30. A drive nut 48 is threaded onto the screw drive 46. The exterior surface of the nut 48 is threaded 50 and screwed into the open rear end of the piston 30. The nut 48 also includes a radial flange 52 on the rear end thereof engaging the rear of the piston 30. As the screw drive 46 is rotated, the drive nut 48 is driven forwardly toward the connection mechanism 16 or driven rearwardly away from the connection mechanism 16. Since the nut 48 is fixed to the piston 30, the piston 30 moves with the nut 48.

Figure 2:
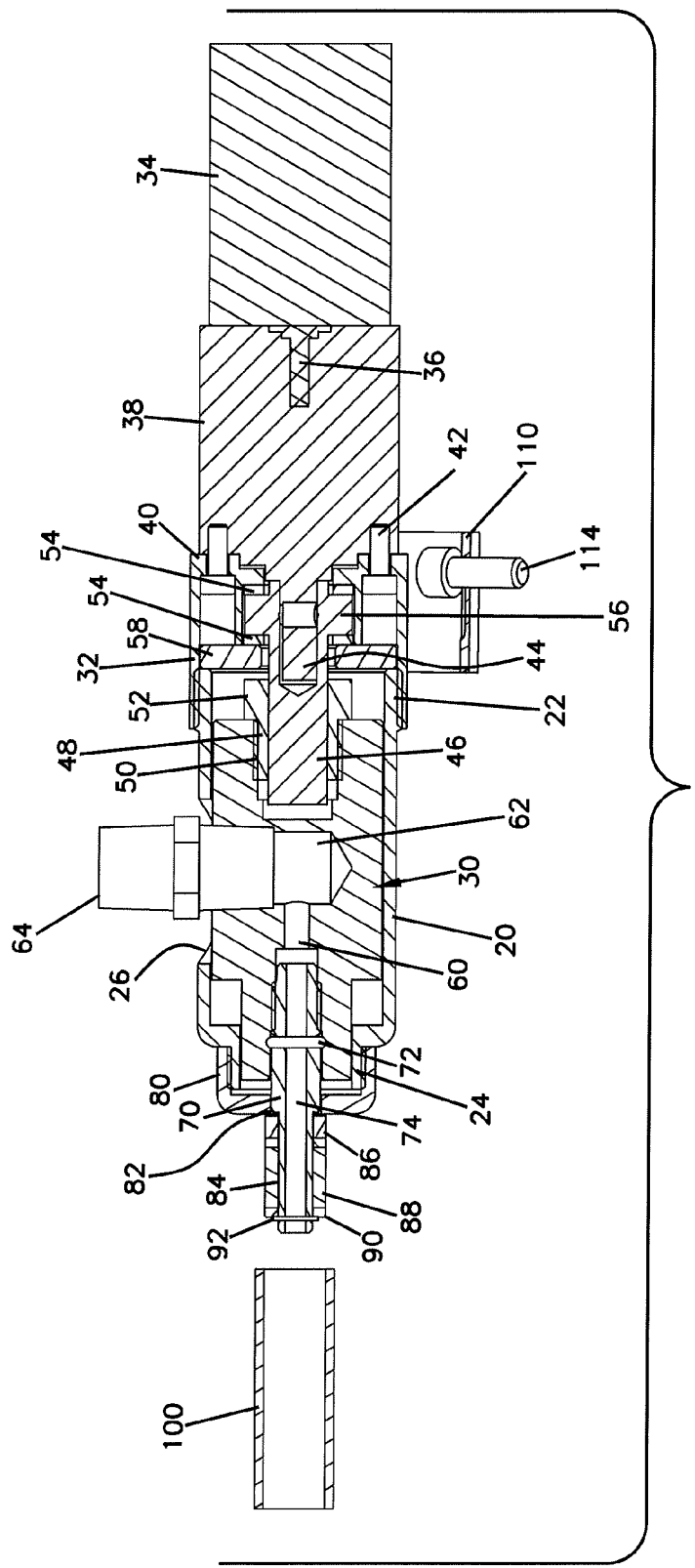
FIG. 2 is a longitudinal cross-sectional view of the connector of FIG. 1 taken along line 2-2.

As shown in FIG. 2, thrust washers 54 are disposed on either side of a flange 56 at the rear of the screw drive 46 within the nut 32. The thrust washers 54 prevent transfer of thrust to drive gears in the reduction mechanism 38. In addition, a drive support washer 58 is provided between the back end 22 of the sleeve 20 and the thrust washers 54, disposed around the screw drive 46 within the nut 32.

The actuation piston 30 includes an internal axial passageway 60 extending through the front end thereof, and a radial passage 62 connected to the axial passageway 60. A threaded fitting 64 is threaded into the radial passage 62, and forms a means to connect to the first fluid system.

A tube 70, forming part of the connection mechanism 16, is threaded within the axial passageway 60 and extends beyond the end of the piston 30. A seal 72 is provided to seal between the outer circumference of the tube 70 and the interior of the passageway 60. The tube 70 includes an internal flow passage 74 that communicates with the rear of the passageway 60 and with the radial passage 62.

In addition to the tube 70, the connection mechanism 16 includes a cap 80 that is threaded onto the front end 24 of the sleeve 20. The cap 80 includes a central opening 82 through which the tube 70 passes. At the point where the tube 70 extends past the cap 80, the tube 70 includes a reduced diameter section 84 that extends to the front end of the tube 70. A washer 86 is slid over the reduced diameter section 84, followed by a tubular seal 88, and another washer 90. The washer 86, the seal 88 and the washer 90 are retained on the tube 70 by a lock ring 92.

The connection mechanism 16 is designed to connect to an interface 100, for example a smooth tube, of the second fluid system to be connected to. The interface 100 illustrated is exemplary only. Other interfaces are possible. The type of interface on the second fluid system that is to be connected to will in part dictate the type of connection mechanism 16 that is used. Therefore, the connection mechanism 16 described herein is exemplary only and other connection mechanisms could be used.

To achieve connection, the projecting end of the tube 70 is inserted into the end of the interface 100. The motor 34 is then activated to rotate the drive shaft 36 which rotates the screw drive 46 via the reduction mechanism 38. Rotation of the screw drive 46 in turn causes linear motion of the nut 48 and the piston 30. During connection, the screw drive 46 is preferably rotated in a direction to cause the nut 48 and the piston 30 to move rearwardly relative to the sleeve 20. The slot 26 in the sleeve 20 accommodates the rearward and forward movements of the piston 30. The fitting 64 protruding through the slot 26 limits rotational movement of the piston 30.

When the piston 30 is pulled to the rear, the tube 70 is retracted into the connector 10. This causes the seal 88 to be compressed between the washers 86, 90, due to engagement between the washer 86 and the cap 80. As the seal 88 is compressed, it expands in diameter, and seals against the inner diameter of the interface 100. Processing can then occur through the connector 10, with fluid being able to flow through the connector between the first and second fluid systems.

When connected, the connection mechanism 16 only seals with the interface. There is no gripping ability provided by the connector other than the friction of the seal 88 against the inner diameter of the interface.

Disconnection is achieved by activating the motor 34 to rotate the screw drive 46 in the opposite direction, which causes the nut 48 and the piston to travel forwardly. This extends the tube 70 further out the front of the connector 10, which releases the compression on the seal 88 allowing the end of the connector 10 to be withdrawn from the interface 100.

Due to the weight of the electric drive mechanism 14, a mounting bracket 110 can be provided to mount the connector 10 to a fixed structure. The bracket 110 can be secured to the connector 10 via screws 112, and one or more mounting pins 114 extends from the base of the bracket 110 to mount into the fixed structure.

A number of different power source and control options are available for the connector to control operation of the electric motor and the connector.

Figure 3:
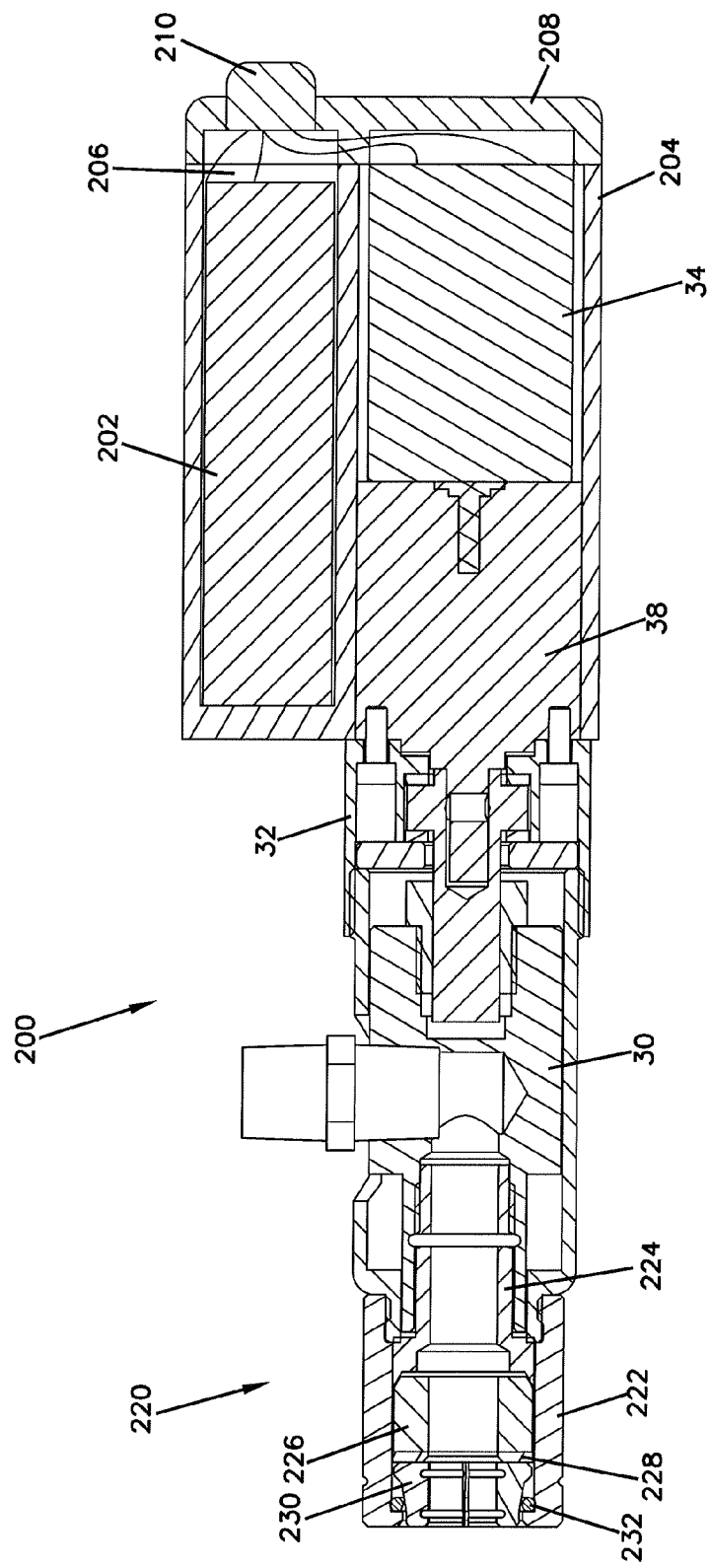
FIGS. 3-8 illustrate embodiments of connectors employing variations of power supply, sensing, and/or control features.

FIG. 3 illustrates a connector 200 in which the same reference numerals indicate elements that are similar to those described above. The connector 200 includes an integrated battery 202 for powering the electric motor 34. The motor 34 and the reduction mechanism 38 are enclosed in a housing 204. The housing 204 includes a space 206 to the side of the motor 34 and the reduction mechanism 38 that receives one or more of the batteries 202. The battery 202 can be a rechargeable battery that is rechargeable in the space 206 or else requiring removal for charging.

A removable cap 208 closes the end of the housing 204 and the space 206, while permitting access to the battery 202 and the motor 34 upon removal of the cap. A push button 210 on the cap 208 provides start and stop control of the motor 34 by controlling power to the motor. Other means of providing start and stop control of the motor can be used either in addition to the push button or separately therefrom, for example a remote user start/stop button or foot switch.

The connector 200 also differs from the connector 10 by using a different connection mechanism 220 to connect to the second fluid line. The connection mechanism 220 is designed to grip and seal with the interface of the second fluid line. The connection mechanism 220 is similar in construction and operation to the connection mechanism disclosed in U.S. Pat. No. 5,507,537. The connection mechanism 220 includes a sleeve 222 that is secured to the sleeve 20. A hollow tube 224 is connected by threads to the piston 30 and extends partially into the sleeve 222. A seal 226 is disposed inside the sleeve 222, sandwiched between the end of the tube 224 and a washer 228. A plurality of split collets 230 are disposed inside the front end of the sleeve 222, with outer surfaces of the collets 230 being sloped. A wear ring 232 is disposed between the outer surface of the collets 230 and the inner surface of the sleeve 222 so as to reduce the wear on the collets and the sleeve.

In use, the interface of the second fluid system is inserted into the connection mechanism 220. The piston 30 is advanced axially to push against the seal 226. This compresses and extrudes the seal 226 against the outer diameter of the interface. At the same time, the collets 230 are ramped inward onto the outer diameter to grip the interface.

Figure 4:
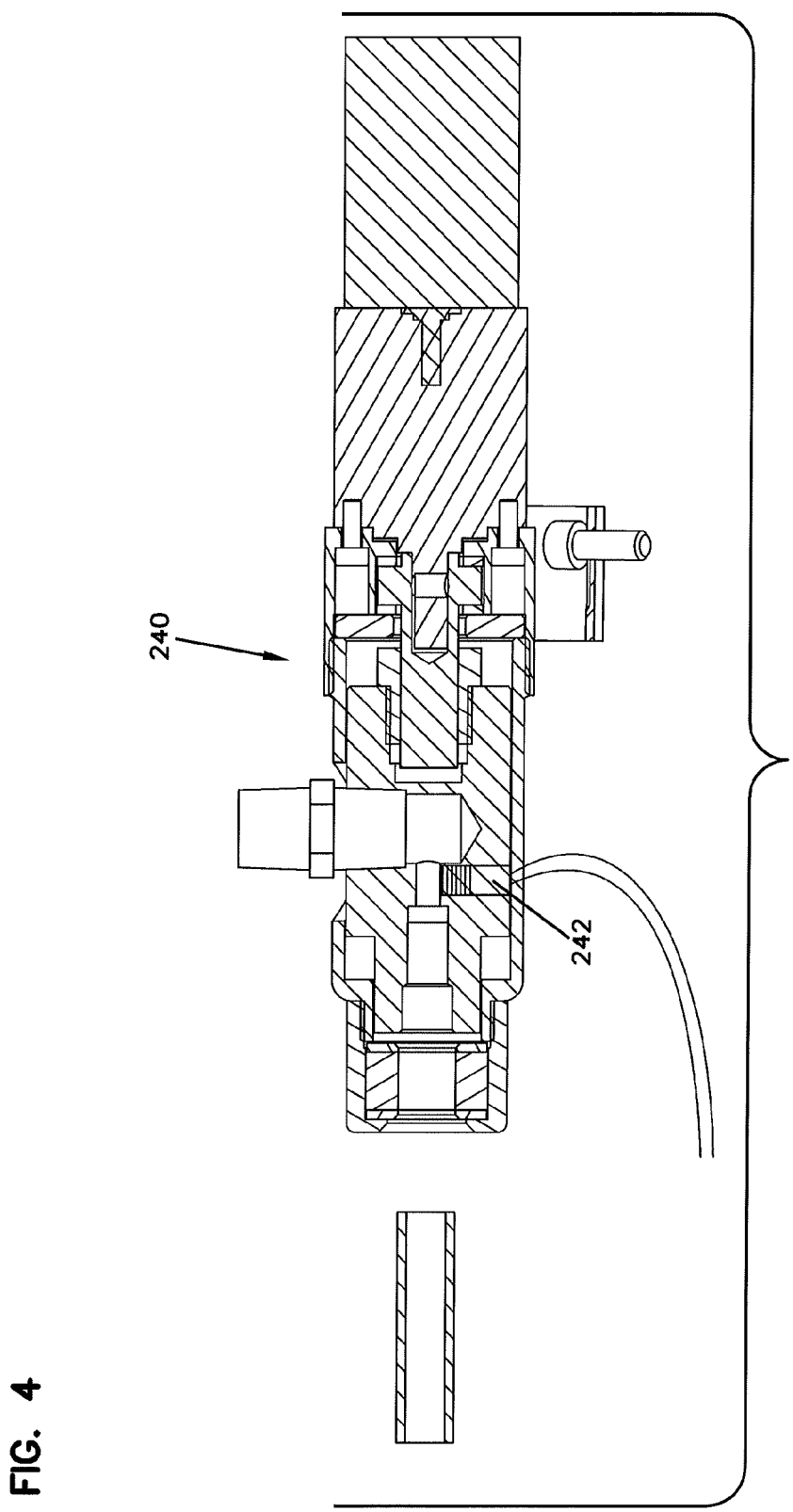

FIG. 4 illustrates a connector 240 that incorporates one or more sensors 242. The sensor(s) 242 can be used to control operation of the connector 240 and/or for monitoring conditions of fluid flowing through the connector. Examples of sensors 242 include, but are not limited to, sensors for flow, pressure, temperature, and leak rate measurements.

Figure 5:
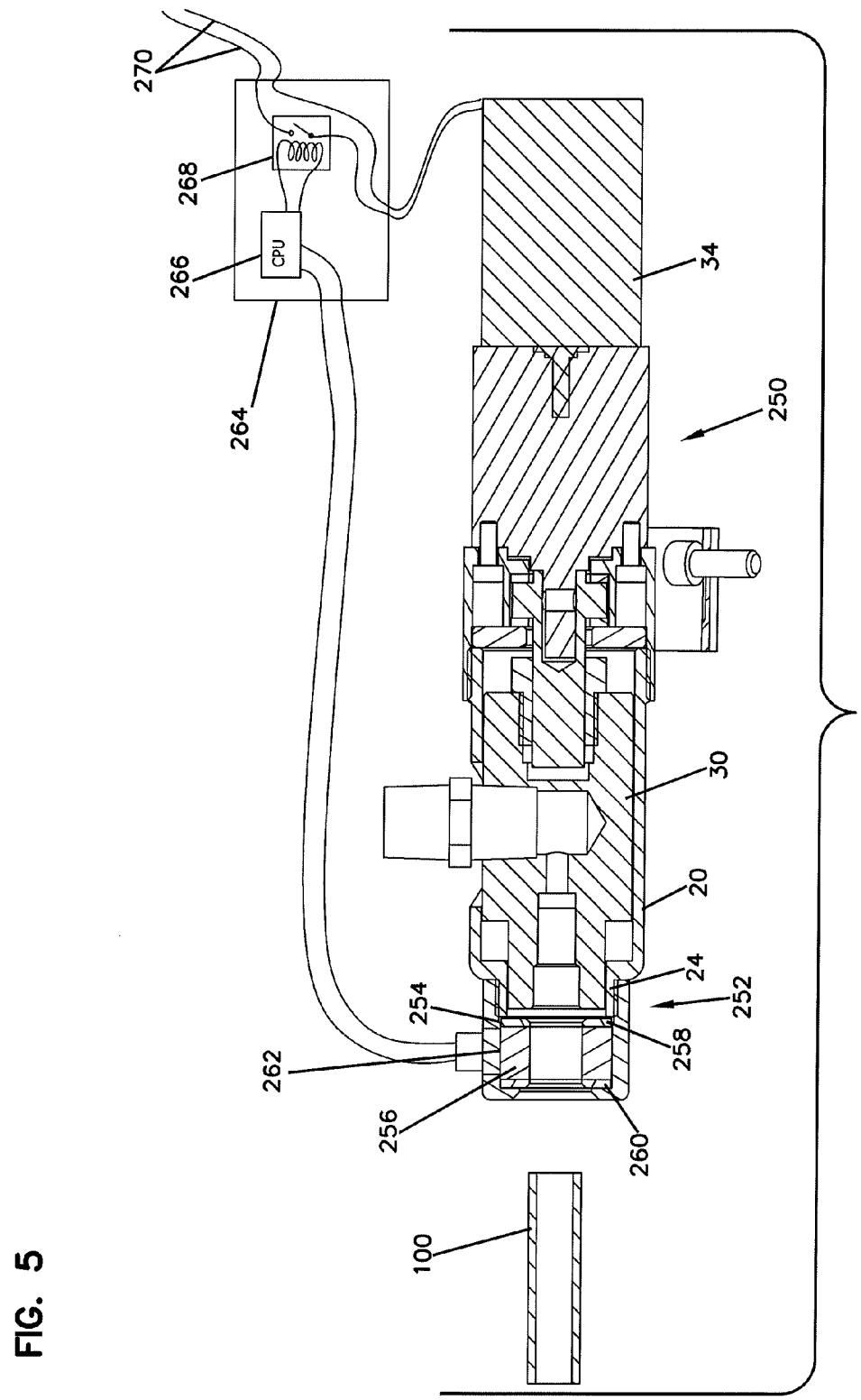

FIG. 5 illustrates a connector 250 that senses the pressure applied to the interface 100 to control actuation of the connector 250. The same reference numerals indicate elements that are similar to those described above. The connector 250 includes a connection mechanism 252 that is designed to seal with the outer diameter of the interface 100. There is no gripping ability provided by the connection mechanism 252 other than the friction of the seal against the outer diameter of the interface 100.

The connection mechanism 252 includes a sleeve 254 that is secured to the end 24 of the sleeve 20. A seal 256 is disposed inside the sleeve 254, sandwiched between two washers 258, 260. The washer 258 is movable axially within the sleeve 254. In use, the interface 100 is inserted into the connection mechanism 252. The piston 30 is advanced axially to push the washer 258. This compresses and extrudes the seal 256 against the outer diameter of the interface 100.

A pressure sensor 262 is mounted in the sleeve 254 and contacts the seal 256. The sensor 262 reads the pressure on the seal 256 which reflects the pressure applied to the interface 100. An example of a suitable pressure sensor 262 is a wheatstone bridge strain gage. The pressure sensor 262 is connected to a control system 264 that includes a processor 266 and an electronic switch 268 connected to a power supply 270. The processor 266 interprets the sensor 262 measurement, and when the pressure exceeds a predetermined level, opens the switch 268 to disconnect power from the motor 34 and stop the motor.

Figure 6:
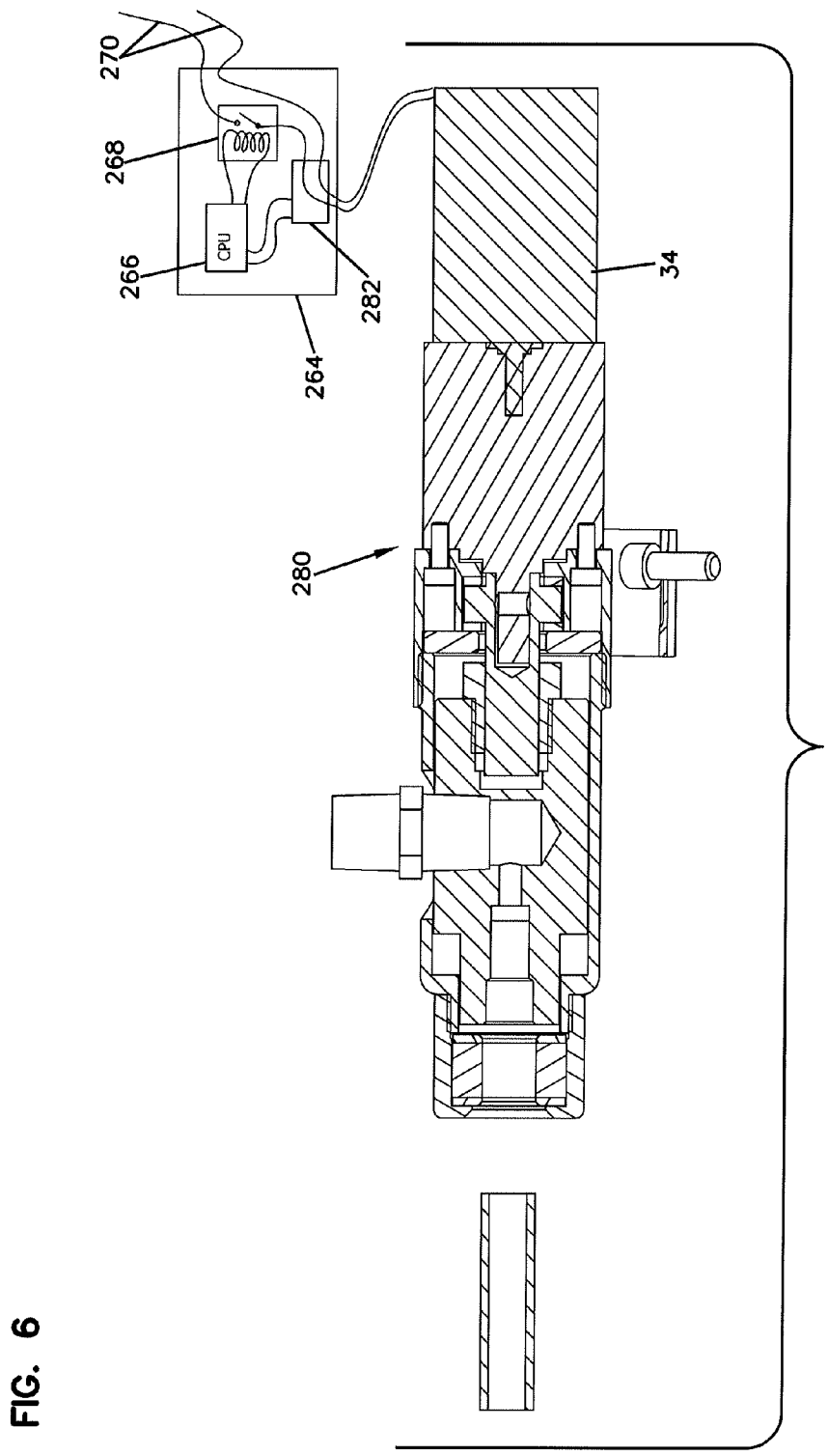

FIG. 6 illustrates a connector 280 that uses a current limiter to control operation of the connector 280. The same reference numerals indicate elements that are similar to those described above. The connector 280 is controlled by the control system 264 that includes the processor 266 and the switch 268. The control system 264 includes a current sensor 282 that monitors the amount of current drawn by the motor 34 and relays the reading to the processor 266. The more resistance the motor 34 encounters, the greater the force required and the more current needed. The control system 264 can shut-off or limit the amount of power delivered based on the current required.

Figure 7:
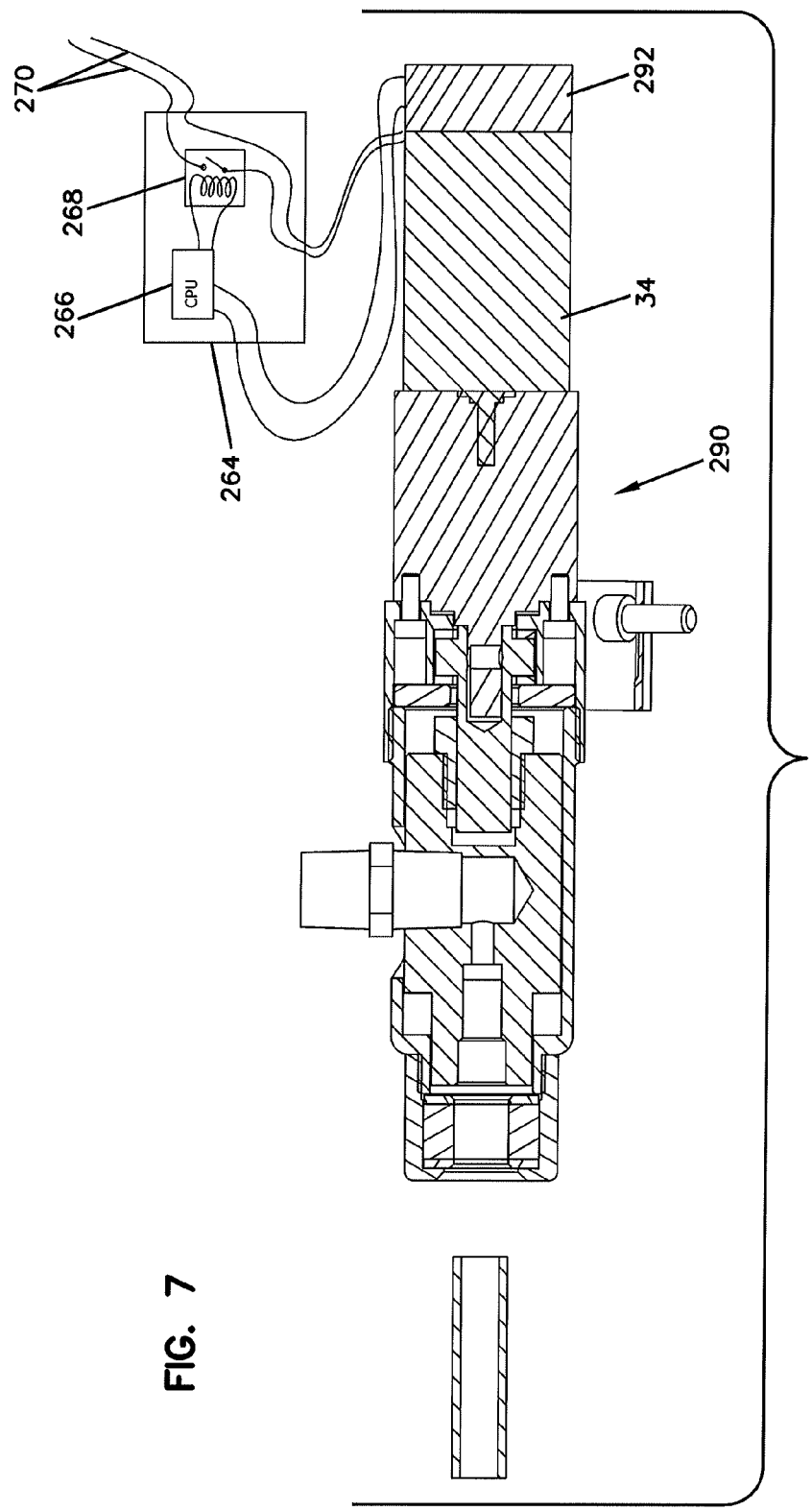

FIG. 7 illustrates another embodiment of a connector 290 where the same reference numerals indicate elements that are similar to those described above. In the connector 290, an encoder 292 is connected to the motor 34. The encoder 292 is connected to the processor 266 of the control system 264 which interprets the encoder position and based thereon controls the switch 268 to control operation of the motor 34.

Figure 8:
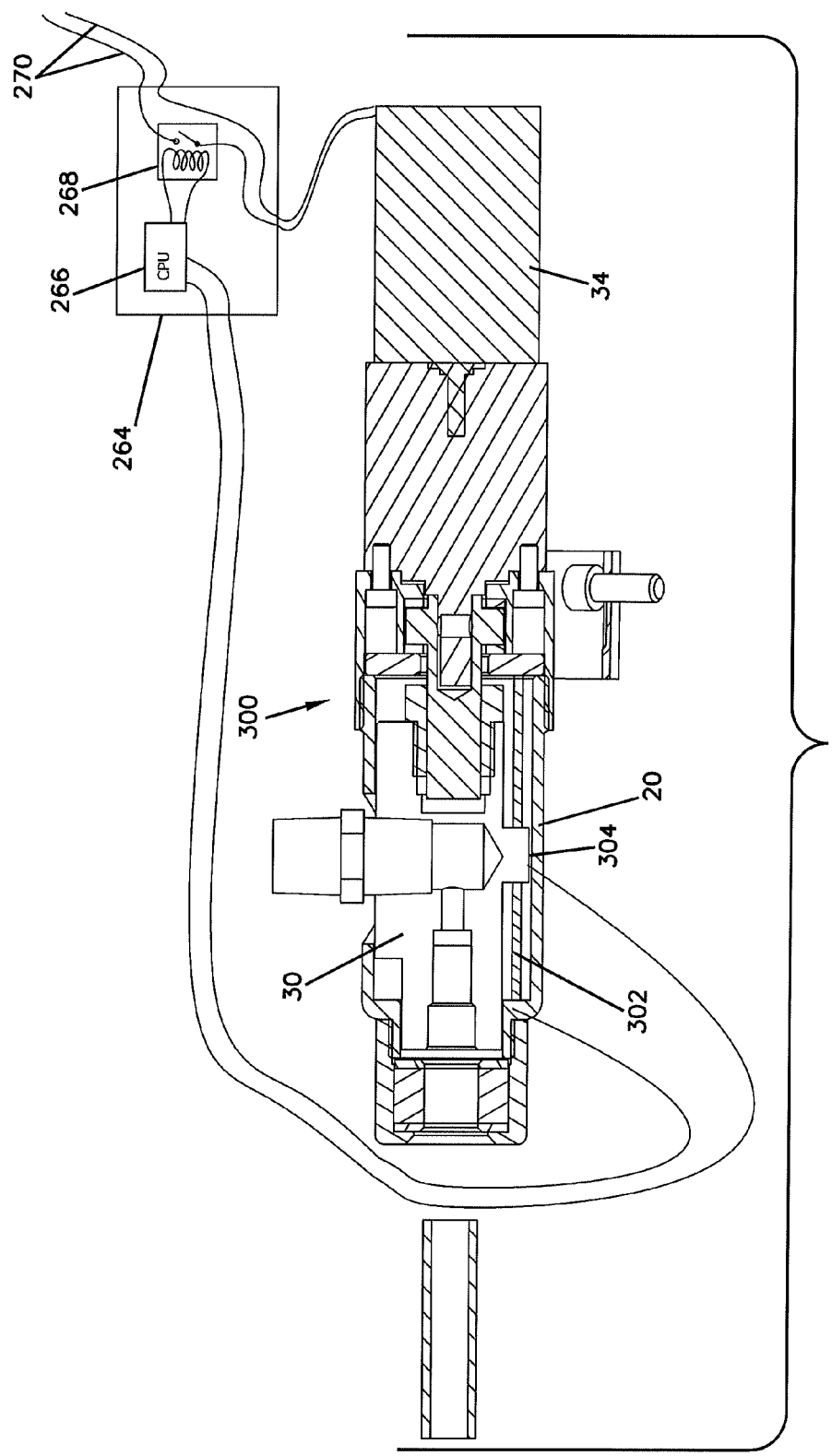

FIG. 8 illustrates another embodiment of a connector 300 using a linear transducer where the same reference numerals indicate elements that are similar to those described above. In the connector 300, a resistor rod 302 is fixed within the sleeve 20. A shunt 304 that is fixed to the piston 30 is slideable back and forth on the rod 302. The rod 302 is electrically connected to the processor 266 and the shunt 304 is electrically connected back to the processor 266. In operation, current is directed to the rod 302, and therethrough to the shunt 304 back to the processor 266. As the shunt 304 moves back and forth, the resistance observed by the processor 266 changes. The change in resistance indicates the position of the piston 30, and based thereon controls operation of the motor 34.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A connector configured to fluidly connect a first fluid system to a second fluid system, comprising:
    a connector body having a first fluid passageway that in use is in fluid communication with the first fluid system;
    a connection mechanism connected to the connector body and configured to mechanically and fluidly connect the connector to the second fluid system, the connection mechanism being actuatable between a connected configuration at which the connection mechanism mechanically connects to the second fluid system and a disconnected configuration, and the connection mechanism defining a second fluid passageway that is in fluid communication with the first fluid passageway to provide fluid communication between the first fluid system and the second fluid system through the connector when in the connected configuration;
    an electric motor connected to the connector body and to the connection mechanism to actuate the connection mechanism between the connected configuration and the disconnected configuration; and
    the connector body has first and second ends, the electric motor is connected to the first end of the connector body, and the connection mechanism is connected to the second end of the connector body.

2. The connector of claim 1, further comprising a reduction mechanism engaged with the electric motor.

3. The connector of claim 1, wherein the electric motor is a two-way motor with forward and reverse capability.

4. The connector of claim 1, wherein the electric motor is connected to a screw drive.

5. The connector of claim 1, further comprising a mounting bracket connected to the connector.

6. The connector of claim 1, further comprising a battery.

7. The connector of claim 1, further comprising a fluid sensor.

8. The connector of claim 1, further comprising a control system connected to the electric motor to control power flow thereto, the control system including a processor and a switch.

9. The connector of claim 8, comprising a pressure sensor, a current limiter, an encoder or a linear transducer connected to the control system.

10. A connector for connecting a first fluid system to a second fluid system, comprising:
    a connector body having a sleeve and a piston at least partially disposed within the sleeve, the sleeve and the piston each including a longitudinal axis, the piston and the sleeve being slideable relative to each other in a direction parallel to the longitudinal axis, and the piston including an axial fluid passage parallel to the longitudinal axis and a radial fluid passage;
    a connection mechanism connected to a first end of the connector body and configured to connect the connector to the second fluid system, the connection mechanism defining a fluid passage in communication with the axial fluid passage and the radial fluid passage;
    an electric motor connected to a second end of the connector body whereby the electric motor is integrated into and forms a part of the connector, the motor including a drive shaft; and
    a drive train connecting the drive shaft to the piston.

11. The connector of claim 10, wherein the drive train includes a reduction mechanism connected to the drive shaft.

12. The connector of claim 11, wherein the drive train includes a screw drive connected to the reduction mechanism and to the piston.

13. The connector of claim 10, further comprising a mounting bracket connected to the connector.

14. The connector of claim 10, further comprising a battery.

15. The connector of claim 10, further comprising a fluid sensor.

16. The connector of claim 10, further comprising a control system connected to the electric motor to control power flow thereto, the control system including a processor and a switch.

17. The connector of claim 16, comprising a pressure sensor, a current limiter, an encoder or a linear transducer connected to the control system.

18. The connector of claim 10, wherein the drive train is a mechanical drive train that directly connects the drive shaft to the piston.

19. The connector of claim 10, wherein the drive shaft of the electric motor has an axis that is coaxial to the axial fluid passage.

20. A connector for connecting a first fluid system to a second fluid system, comprising:
   a connector body having a sleeve and a piston at least partially disposed within the sleeve, the piston and the sleeve being slideable relative to each other, and the piston including an axial fluid passage and a radial fluid passage;
   a connection mechanism connected to a first end of the connector body and configured to connect the connector to the second fluid system, the connection mechanism defining a fluid passage in communication with the axial fluid passage and the radial fluid passage;
   an electric motor connected to a second end of the connector body whereby the electric motor is integrated into and forms a part of the connector, the motor including a drive shaft, and the electric motor is a two-way motor with forward and reverse capability; and
   a drive train connecting the drive shaft to the piston.

21. A connector for connecting a first fluid system to a second fluid system, comprising:
   a connector body having a sleeve and a piston at least partially disposed within the sleeve, the piston and the sleeve being slideable relative to each other, and the piston including an axial fluid passage and a radial fluid passage;
   a connection mechanism connected to a first end of the connector body and configured to connect the connector to the second fluid system, the connection mechanism defining a fluid passage in communication with the axial fluid passage and the radial fluid passage;
   an electric motor connected to a second end of the connector body whereby the electric motor is integrated into and forms a part of the connector, the motor including a drive shaft; and
   a drive train connecting the drive shaft to the piston; and
   the connection mechanism is actuatable between a connected configuration at which the connection mechanism connects to the second fluid system and a disconnected configuration, and the electric motor actuates the connection mechanism between the connected configuration and the disconnected configuration.

* * * * *